United States Patent
Masaoka et al.

(10) Patent No.: US 7,428,224 B2
(45) Date of Patent: Sep. 23, 2008

(54) RADIO BASE STATION SYSTEM, AND METHOD AND PROGRAM FOR CONTROLLING TRANSMISSION OF SYNCHRONOUS BURST

(75) Inventors: Nobuhiro Masaoka, Gifu (JP); Seigo Nakao, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 782 days.

(21) Appl. No.: 10/450,713

(22) PCT Filed: Dec. 21, 2001

(86) PCT No.: PCT/JP01/11311

§ 371 (c)(1),
(2), (4) Date: Jun. 24, 2003

(87) PCT Pub. No.: WO02/054815

PCT Pub. Date: Jul. 11, 2002

(65) Prior Publication Data

US 2004/0067774 A1    Apr. 8, 2004

(30) Foreign Application Priority Data

Dec. 27, 2000    (JP) .............................. 2000-396882

(51) Int. Cl.
*H04Q 7/28*    (2006.01)

(52) U.S. Cl. ...................................... 370/329; 370/345

(58) Field of Classification Search .................. 370/458, 370/443, 455, 450, 329, 345, 304, 479, 58, 370/59; 455/502, 450, 561, 436, 522, 33.1, 455/435.2, 466; 710/109; 240/3.52
See application file for complete search history.

(56) References Cited

U.S. PATENT DOCUMENTS

| 5,201,053 | A | * | 4/1993 | Benhase et al. | 710/109 |
| 5,473,669 | A | * | 12/1995 | Kanada et al. | 455/435.2 |
| 5,706,276 | A | * | 1/1998 | Arslan et al. | 370/216 |
| 5,878,278 | A | * | 3/1999 | Carreiro et al. | 710/39 |
| 5,943,334 | A | * | 8/1999 | Buskens et al. | 370/350 |
| 6,188,684 | B1 | * | 2/2001 | Setoyama et al. | 370/352 |
| 6,594,485 | B1 | * | 7/2003 | Ezaki | 455/417 |
| 7,075,909 | B1 | * | 7/2006 | Iinuma | 370/329 |

FOREIGN PATENT DOCUMENTS

| JP | 11-69406 | 3/1999 |
| JP | 2000-106696 | 4/2000 |

* cited by examiner

*Primary Examiner*—Kwang B. Yao
*Assistant Examiner*—Andrew Lai
(74) *Attorney, Agent, or Firm*—Westerman, Hattori, Daniels & Adrian, LLP.

(57) ABSTRACT

In a CS in accordance with a PDMA system, control of transmission of a synchronous burst is performed at a transmission data generating DSP (7). In particular, the synchronous burst for reconnection is transmitted with a relatively high transmission level during a plurality of first, successive frames and with a relatively low transmission level during a prescribed number of second, successive frames that follow. Such variation in the transmission level is repeated in a certain frame cycle so that an effect of the synchronous burst for reconnection on another PS connected to the CS will be lowered.

12 Claims, 9 Drawing Sheets

F I G. 7
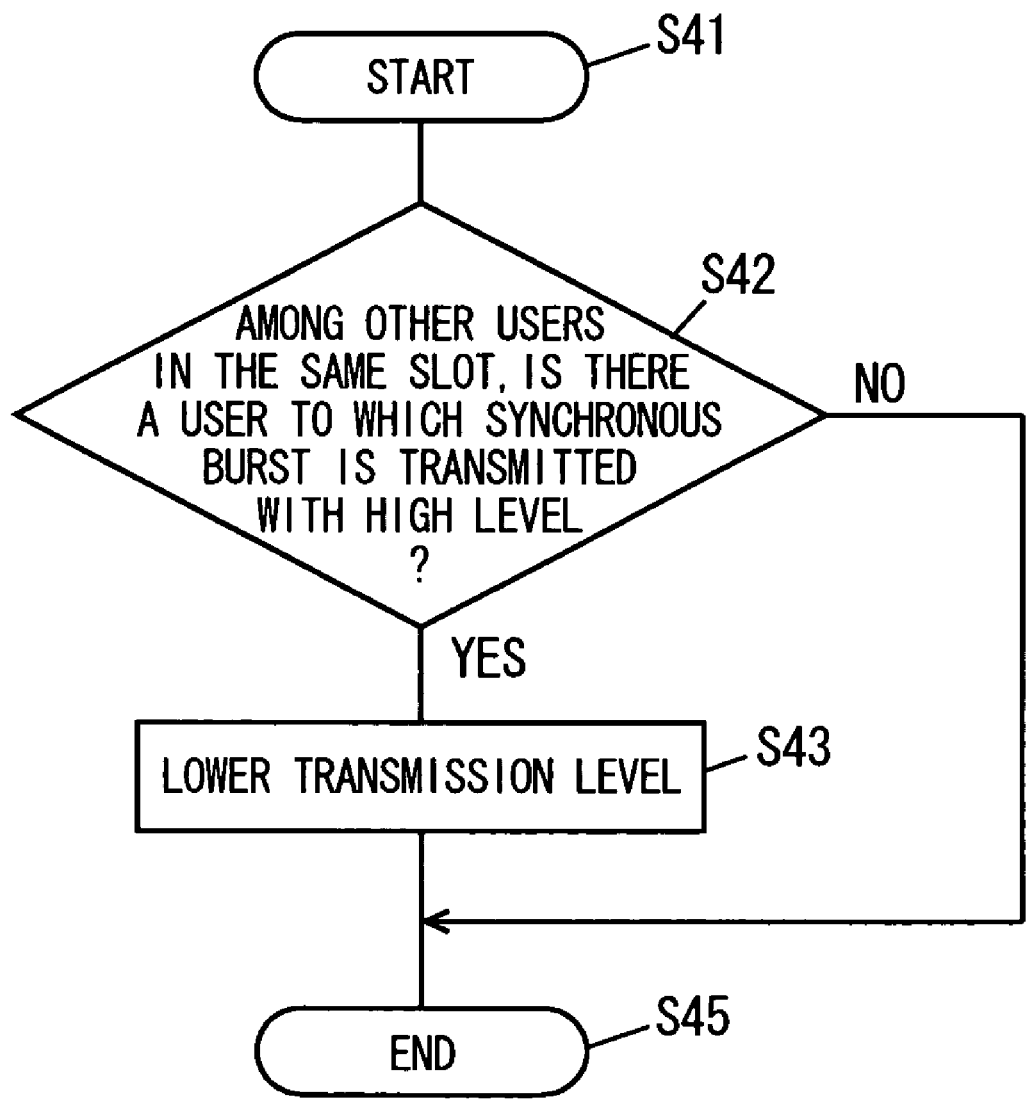

RADIO BASE STATION SYSTEM, AND METHOD AND PROGRAM FOR CONTROLLING TRANSMISSION OF SYNCHRONOUS BURST

TECHNICAL FIELD

The present invention relates to a radio base station system, and a method and a program of controlling transmission of a synchronous burst. In particular, the present invention relates to a radio base station system transmitting a synchronous burst for reconnection to a user terminal of which reception signal has been disrupted, as well as to a method and a program for controlling transmission of such a synchronous burst, in a communication system in accordance with a PDMA (Path Division Multiple Access) system in which a plurality of users can establish spatial multiple access (path multiple access) in one time slot at the same frequency for data transmission/reception.

BACKGROUND ART

In recent years, in rapidly developing mobile communication systems (for example, Personal Handyphone System, hereinafter referred to as "PHS"), in order to make efficient use of frequencies, a variety of methods for controlling transmission channel allocation have been proposed, of which some have been put into practical use.

In particular, recently, a PDMA system has been proposed to improve efficiency in the use of radio wave frequencies as mobile telephones have come into widespread use. In the PDMA system, one time slot of the same frequency is spatially divided for data transmission of a plurality of users.

In the PDMA system, one time slot is spatially divided into a plurality of channels using a mutual interference canceller such as an adaptive array, allowing a plurality of users who will cause little interference with each other to establish path multiple access to the time slot.

More specifically, in the PDMA system, a cell station (hereinafter, referred to as a "CS") separates and extracts a multiple streams of signal waves from personal stations (hereinafter, referred to as a "PS") of a plurality of users who have established path multiple access to channels of the same frequency and the same time slot, using well-known adaptive array processing.

FIG. 9 schematically shows path multiple access state between a CS and PSs in the PDMA system. Referring to FIG. 9, assume that, for example, three PSs, that is, a PS 10 of a user A, a PS 20 of a user B and a PS 30 of a user C have initially established path multiple access to a CS 100.

Here, if PS 10 is disconnected from CS 100, as shown by an arrow (X) for a reason such as movement of user A out of area or deterioration of a transmission path due to interference and the like, PS 10 will try to establish a connection with another CS 200 (what is called "handover"), as shown by a dashed line and an arrow (Y).

Meanwhile, the previous connection target CS 100, that no longer can receive a radio wave from PS 10, transmits at a prescribed level, a synchronous burst for reestablishing connection to PS 10, that is, a synchronous burst for reconnection, for a period of several tens of seconds, as schematically shown by an arrow (Z).

If PS 10 was not able to establish connection to CS 200 for some reason, PS 10 will try to recover connection with CS 100. The above described synchronous burst for reconnection serves as a mark in such a case. Therefore, if PS 10 can recognize the synchronous burst for reconnection (Z), PS 10 will re-establish synchronization with CS 100, and moreover, re-establish a communication channel with CS 100 through a prescribed sequence. On the other hand, if PS 10 was not able to recognize the synchronous burst for reconnection (Z), PS 10 cannot re-establish synchronization with CS 100, and fails in connection with any CS. Consequently, the communication channel is disconnected.

Here, generally, when a connection between a CS and a PS has been established, a radio wave is transmitted from the CS to the PS with transmission directivity through well-known adaptive array processing, and the radio wave will not interfere with other PSs that have established multiple access to the CS. As described in the example of FIG. 9, however, for example, while PS 10 has been disconnected from CS 100 for handover to CS 200 for a period of several seconds or several tens of seconds, CS 100 is not receiving a signal wave from PS 10, and transmission directivity to PS 10 has been lost. In other words, the synchronous burst for reconnection transmitted at a prescribed level without transmission directivity to PS 10 for several tens of seconds is simply a disturbance wave (an interfering wave) for respective PSs 20 and 30 of other users B and C that have established path multiple access to CS 100.

Therefore, transmission from the CS, of the synchronous burst for reconnection without directivity for a long period of time will have an adverse effect on radio waves of other PSs connected to the CS.

Thus, an object of the present invention is to provide a radio base station system capable of alleviating an effect of a synchronous burst for reconnection on other PSs that have established multiple access to the CS, and capable of easily recovering connection of the PS to the CS, that has failed in handover, as well as to provide a method and a program for controlling transmission of such a synchronous burst.

DISCLOSURE OF THE INVENTION

According to the present invention, a radio base station system transmitting and receiving a signal to and from a plurality of mobile terminals establishing path multiple access through a plurality of spatially-divided channels, includes synchronous burst transmission means and synchronous burst transmission level set means. The synchronous burst transmission means transmits a synchronous burst for reconnection for each signal frame through a disconnected channel when path multiple access to any of the plurality of mobile terminals is disconnected. The synchronous burst transmission level set means sets a transmission level of the synchronous burst for reconnection to a relatively high level in a plurality of first, successive frames; sets a transmission level of the synchronous burst for reconnection to a relatively low level in a plurality of second, successive frames; and periodically repeats setting of the transmission level in a frame cycle formed by the plurality of first, successive frames and the plurality of second, successive frames.

Preferably, the synchronous burst transmission means transmits, in a time-divided manner, for respective mobile terminals, a synchronous burst for reconnection having a transmission level set in the frame cycle, when there are a plurality of mobile terminals having path multiple access disconnected.

More preferably, the relatively low level is set to zero level.

More preferably, the radio base station system further includes transmission level modifying means for lowering a transmission level for another mobile terminal among the plurality of mobile terminals during transmission of the synchronous burst for reconnection by the synchronous burst transmission means.

According to another aspect of the present invention, a method of controlling transmission of a synchronous burst in a radio base station system transmitting and receiving a signal to and from a plurality of mobile terminals establishing path multiple access through a plurality of spatially-divided channels, includes the steps of: transmitting a synchronous burst for reconnection for each signal frame through a disconnected channel when path multiple access to any of the plurality of mobile terminals is disconnected; and setting a transmission level of the synchronous burst for reconnection to a relatively high level in a plurality of first, successive frames, setting a transmission level of the synchronous burst for reconnection to a relatively low level in a plurality of second, successive frames, and periodically repeating setting of the transmission level in a frame cycle formed by the plurality of first, successive frames and the plurality of second, successive frames.

Preferably, in the step of transmitting the synchronous burst, when there are a plurality of mobile terminals having path multiple access disconnected, the synchronous burst for reconnection having a transmission level set in the frame cycle is transmitted in a time-divided manner for respective mobile terminals.

More preferably, the relatively low level is set to zero level.

More preferably, the method of controlling transmission of the synchronous burst further includes the step of lowering a transmission level for another mobile terminal among the plurality of mobile terminals during transmission of the synchronous burst for reconnection.

According to yet another aspect of the present invention, a program for controlling transmission of a synchronous burst in a radio base station system transmitting and receiving a signal to and from a plurality of mobile terminals establishing path multiple access through a plurality of spatially-divided channels, causes a computer to execute the steps of: transmitting a synchronous burst for reconnection for each signal frame through a disconnected channel when path multiple access to any of the plurality of mobile terminals is disconnected; and setting a transmission level of the synchronous burst for reconnection to a relatively high level in a plurality of first, successive frames, setting a transmission level of the synchronous burst for reconnection to a relatively low level in a plurality of second, successive frames, and periodically repeating setting of the transmission level in a frame cycle formed by the plurality of first, successive frames and the plurality of second, successive frames.

Preferably, in the step of transmitting the synchronous burst, when there are a plurality of mobile terminals having path multiple access disconnected, the synchronous burst for reconnection having a transmission level set in the frame cycle is transmitted in a time-divided manner for respective mobile terminals.

More preferably, the relatively low level is set to zero level.

More preferably, the program for controlling transmission of the synchronous burst further causes a computer to execute the step of lowering a transmission level for another mobile terminal among the plurality of mobile terminals during transmission of the synchronous burst for reconnection.

Therefore, according to the present invention, the synchronous burst for reconnection is not transmitted continuously at a constant transmission level, but transmitted in a certain cycle, in which periods of high or low (or zero level) transmission level are alternately repeated. Thus, an effect of the synchronous burst for reconnection on other mobile terminals (PS) connected to the radio base station (CS) can be alleviated.

In addition, in the present invention, the transmission level to other mobile terminals that have established path multiple access to the radio base station is lowered during transmission of the synchronous burst for reconnection. Thus, a transmission radio wave to other mobile terminals can be prevented from being a disturbance wave for the synchronous burst for reconnection.

BRIEF DESCRIPTION OF THE DRAWINGS

FIG. 7 is a flowchart illustrating control of a transmission level to another PS connected to a CS.

BEST MODES FOR CARRYING OUT THE INVENTION

Figure 1:
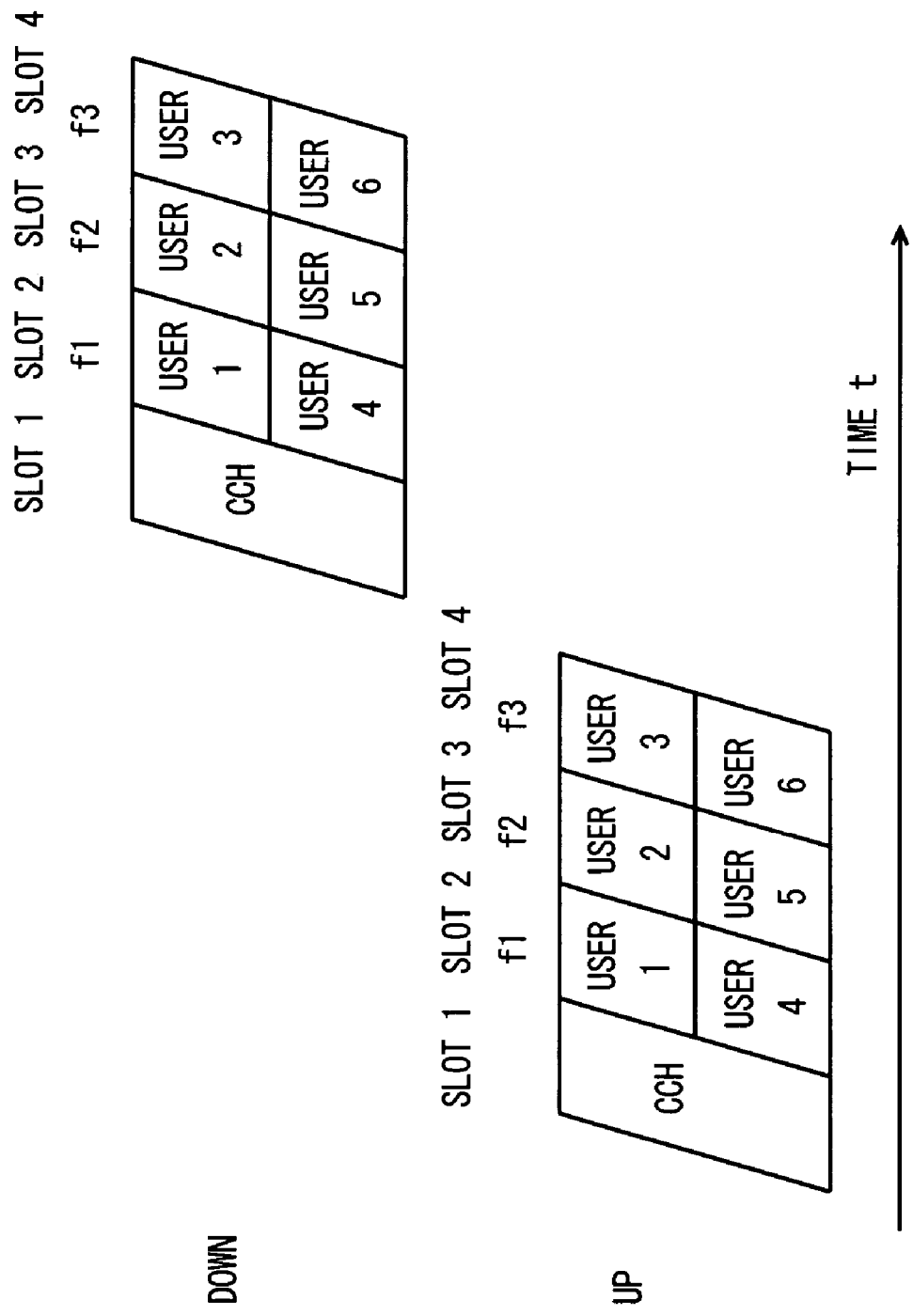
FIG. 1 schematically shows an arrangement of transmission slots in a communication system in accordance with a PDMA system.

In the following, embodiments of the present invention will be described in detail with reference to the figures. It is noted that the same reference characters refer to the same or corresponding components in the figures, and description thereof will not be repeated.

FIG. 1 schematically shows an arrangement of transmission slots for an up link (PS to CS) and a down link (CS to PS) in a communication system in accordance with the PDMA system.

In FIG. 1, the up link and the down link transmit data in units of four slots in a time-sequentially alternate manner, respectively. Both up and down links have the same format.

A control channel (hereinafter, referred to as "CCH") is allocated to any given one slot (here, a first slot is assumed). Users 1 and 4 establish path multiple access to a slot 2 of next frequency f1, users 2 and 5 establish the same to a slot 3 of a frequency f2, and users 3 and 6 establish the same to a slot 4 of the last frequency f3.

Figure 2:
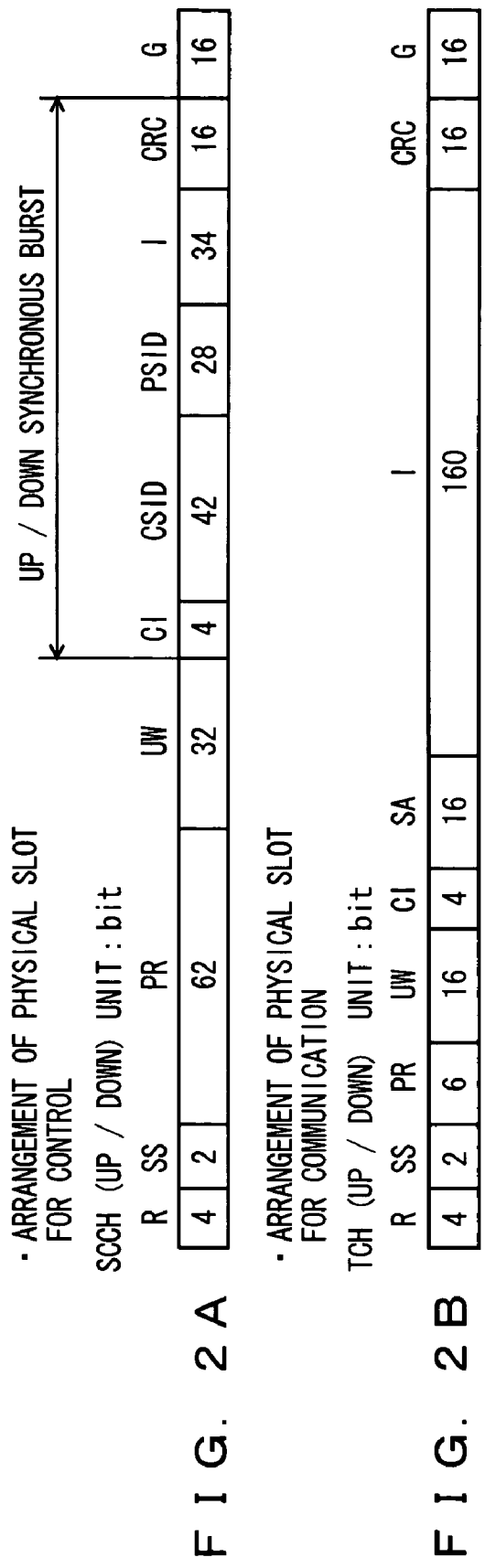
FIGS. 2A and 2B show signal formats transmitted between a PS and a CS.

In a PHS standard, for example, a signal format per user, transmitted between the CS and the PS of each user connected to each time slot of the CS in FIG. 1 is as shown in FIGS. 2A and 2B.

In other words, a communication channel between the CS and each PS connected thereto includes a signaling control channel (hereinafter, referred to as "SCCH") and a traffic channel (hereinafter, referred to as "TCH") having physical slot arrangements in both up and down links thereof, as respectively shown in FIGS. 2A and 2B.

More specifically, the SCCH includes: R (ramp time for transient response) of 4 bits; SS (start symbol) of 2 bits; PR (preamble) of 62 bits; UW (unique word) of 32 bits; CI (channel identification) of 4 bits; CSID (CS identification code) of 42 bits; PSID (PS identification code) of 28 bits; I (up/down idle bit) of 34 bits; CRC (cyclic redundancy check) of 16 bits; and G (guard bit) of 16 bits.

Among the above, CI (4 bits), CSID (42 bits), PSID (28 bits), I (34 bits) and CRC (16 bits) constitute a synchronous burst in each up/down link.

Meanwhile, the TCH includes: R of 4 bits; SS of 2 bits; PR of 6 bits; UW of 16 bits; CI of 4 bits; SS of 16 bits; I of 160 bits; CRC of 16 bits; and G of 16 bits.

The SCCH shown in FIG. 2A is used for activating the TCH shown in FIG. 2B, to establish a traffic channel.

Note that a total of 8 slots shown in FIG. 1 constitutes one frame for a transmission signal. Each slot has a time length of 625 microseconds, and therefore, one frame has a time length of five milliseconds.

Figure 3:
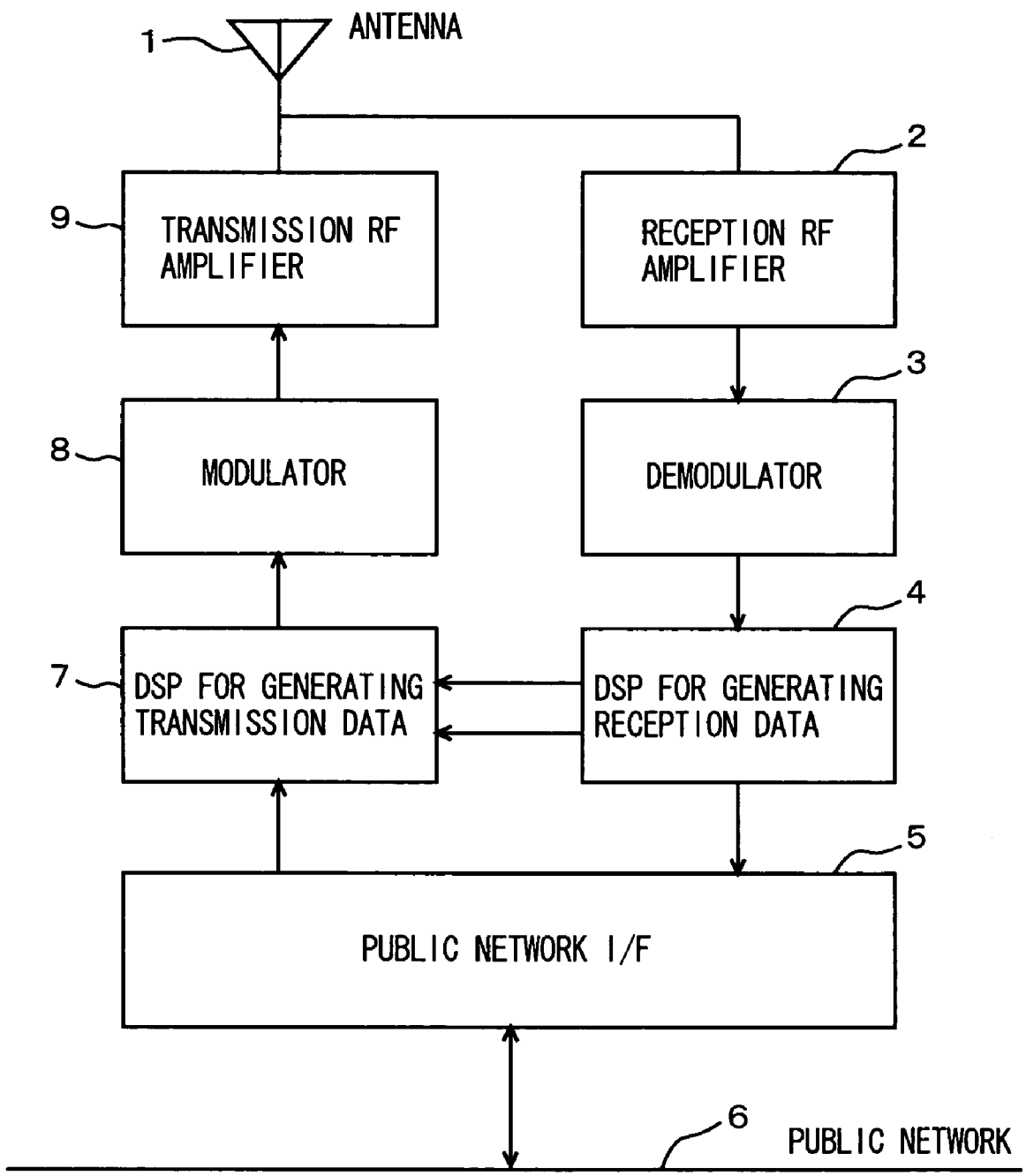
FIG. 3 is a functional block diagram showing a configuration of a CS in accordance with the PDMA system according to an embodiment of the present invention.

Next, FIG. 3 is a functional block diagram showing a configuration of the CS in accordance with the PDMA system in an embodiment of the present invention.

As described in conjunction with FIGS. 2A and 2B, a signal wave communicated between the CS and the PS includes the control channel SCCH transmitting information necessary for call connection and the traffic channel TCH used for communication.

Referring to FIG. 3, a multiple streams of reception signal waves from a plurality of not-shown PSs, received by an array antenna 1 formed by a plurality of not-shown antennas, are subjected to a prescribed reception processing such as amplification, frequency conversion and the like at a reception RF amplifier 2. Thereafter, the signal waves are converted to digitally demodulated signals by a demodulator 3, and supplied to a digital signal processor (DSP) 4 for reception data processing.

In DSP 4, the digitally demodulated signals are subjected to a variety of processings by software, including well-known adaptive array processing. Then, reception signals of respective users are separated and extracted by Weight vectors calculated for respective users. The separated and extracted reception signals from respective users are connected to a public network 6 through a public network interface I/F 5.

Meanwhile, a transmission signal from public network 6 is provided to a DSP 7 for generating transmission data through public network I/F 5. The weight vectors for respective users calculated by DSP 4 for reception data processing are provided to DSP 7 for generating transmission data; and transmission directivities of respective users are determined.

Digital transmission data generated in DSP 7 for generating transmission data is modulated to an analog transmission signal in a modulator 8, and provided to a transmission RF amplifier 9. Transmission RF amplifier 9 performs transmission processing to a multiple streams of transmission signals, and transmits the signals with transmission directivity to the PS of a corresponding user through array antenna 1.

Figure 4:
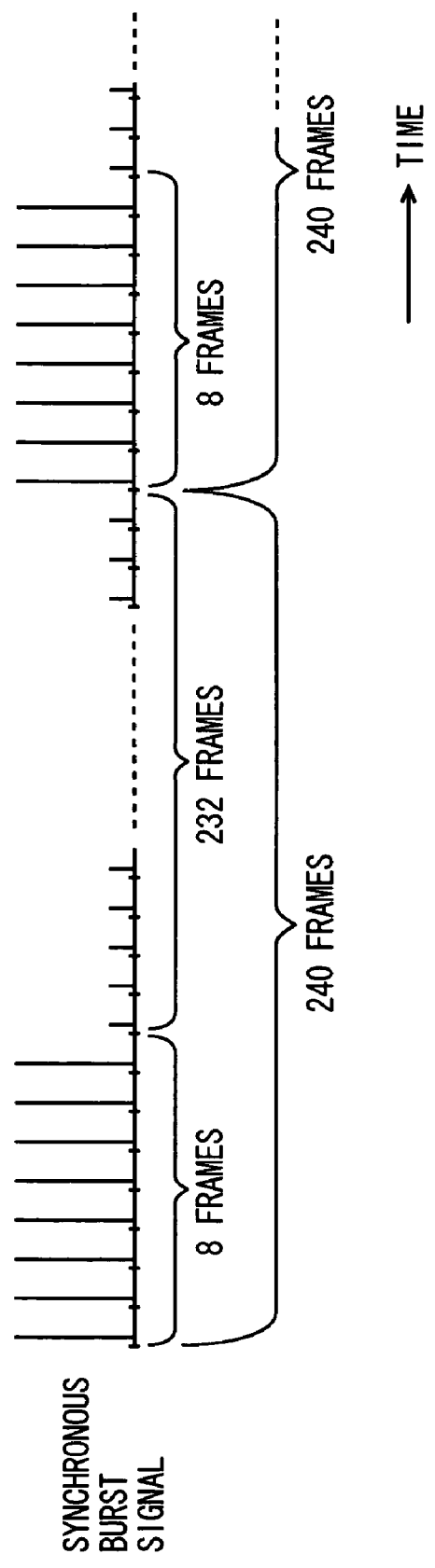
FIG. 4 is a timing chart illustrating a principle of the present invention.

Next, FIG. 4 is a timing chart showing a principle of the present invention, and FIGS. 5 to 8 are flowcharts showing control of transmission of a synchronous burst for reconnection by a CS according to the embodiment of the present invention shown in FIG. 3.

As described previously, conventionally, when a PS tries to switch a connection target to another CS because the PS moves out of area of the previous CS or because there is an interference on a transmission path, the previous CS transmits, at a prescribed level, a down (CS to PS) synchronous burst for reconnection for a prescribed time period in a channel that has been used for communication with the PS. This, however, resulted in a disturbance wave (an interfering wave) for other PSs connected to the CS.

The CS according to the embodiment of the present invention transmits the synchronous burst for reconnection, not at a constant level continuously for a prescribed time period, but with different transmission levels in a certain cycle, so as to lower an effect of the synchronous burst for reconnection on other PSs.

An example of a control step in the embodiment will be described below with reference to FIGS. 4 to 7. As shown in FIG. 4, it is assumed that one cycle is formed by 240 frames (one frame is 5 milliseconds long, and 240 frames are 1.2 seconds long). A down synchronous burst is transmitted with a relatively high level during successive first eight frames, and with a relatively low level during remaining successive 232 frames. If the relatively low level is set to zero, the synchronous burst will be transmitted only during first eight frames, and not transmitted during remaining 232 frames. Thus, an intermittent operation is realized.

As shown in FIG. 4, such variation in transmission levels is repeated in a cycle of 240 frames, thereby lowering an effect of the synchronous burst for reconnection on other PSs, as compared with an conventional example, in which the down synchronous burst is transmitted for reconnection on a constant transmission level in successive frames for several tens of seconds.

Such transmission control of the synchronous burst is realized by software in DSP 7 for generating transmission data of the CS shown in FIG. 3.

Next, referring to FIGS. 5 to 7, control of transmission of the synchronous burst for reconnection by DSP 7 for generating transmission data will be described in detail.

Figure 5:
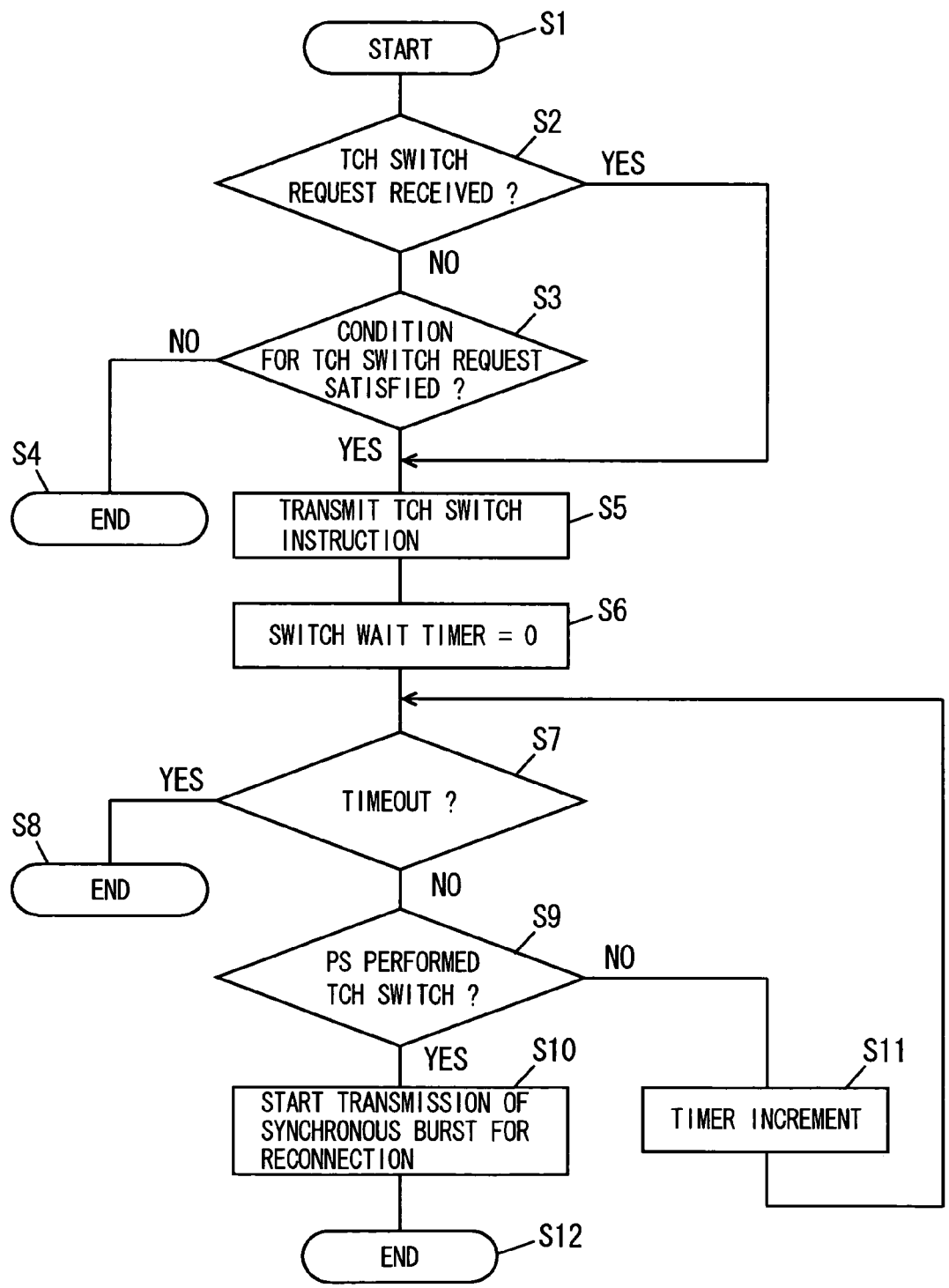
FIG. 5 is a flowchart illustrating a process before starting transmission of a synchronous burst for reconnection.

FIG. 5 is a flowchart showing control steps that take place when the CS in FIG. 4 first detects switching of the PS of one user to another CS (TCH switch) for some reason, and starts transmission of the synchronous burst for reconnection.

Referring to FIG. 5, when control starts in step S1, whether or not the CS has received a TCH switch request requesting switching of a PS of one user to another CS, that is, TCH switch, is determined in step S2. When it is determined that the CS has received the request, the process will proceed to step S5, where the CS transmits to the PS, an instruction for TCH switch.

Meanwhile, when it is determined in step S2 that the request for TCH switch has not been received, the process will proceed to step S3, where the CS determines whether a condition for TCH switch is satisfied or not. When it is determined that the condition for TCH switch is satisfied, the process will proceed to step S5, where the CS transmits to the PS, an instruction for TCH switch. In step S3, when it is determined that the condition for TCH switch is not satisfied, the process will end at step S4.

When the instruction for TCH switch is transmitted in step S5, the process will proceed to S6, where a switch wait timer is initialized to zero. Then, whether or not the PS actually performed TCH switch is determined in step S9, while a count of the switch wait timer is monitored in step S7.

When it is determined that TCH switch has not been performed, steps S7 and S9 as described above are repeated, while the value of the timer is incremented in step S11. Meanwhile, when it is determined in step S9 that the PS has performed TCH switch, the process will proceed to step S10, where transmission of the synchronous burst for reconnection is started. Control of a transmission level of the synchronous burst for reconnection will be described below. The process will end at step S12.

As a result of repeating steps S7, S9 and S11 as described above, when it is determined in step S7 that the count value of switch wait timer reaches a prescribed value, that is, time-out, it is determined that the PS did not actually perform TCH switch. The process will end at step S8, without transmitting the synchronous burst for reconnection.

Figure 6:
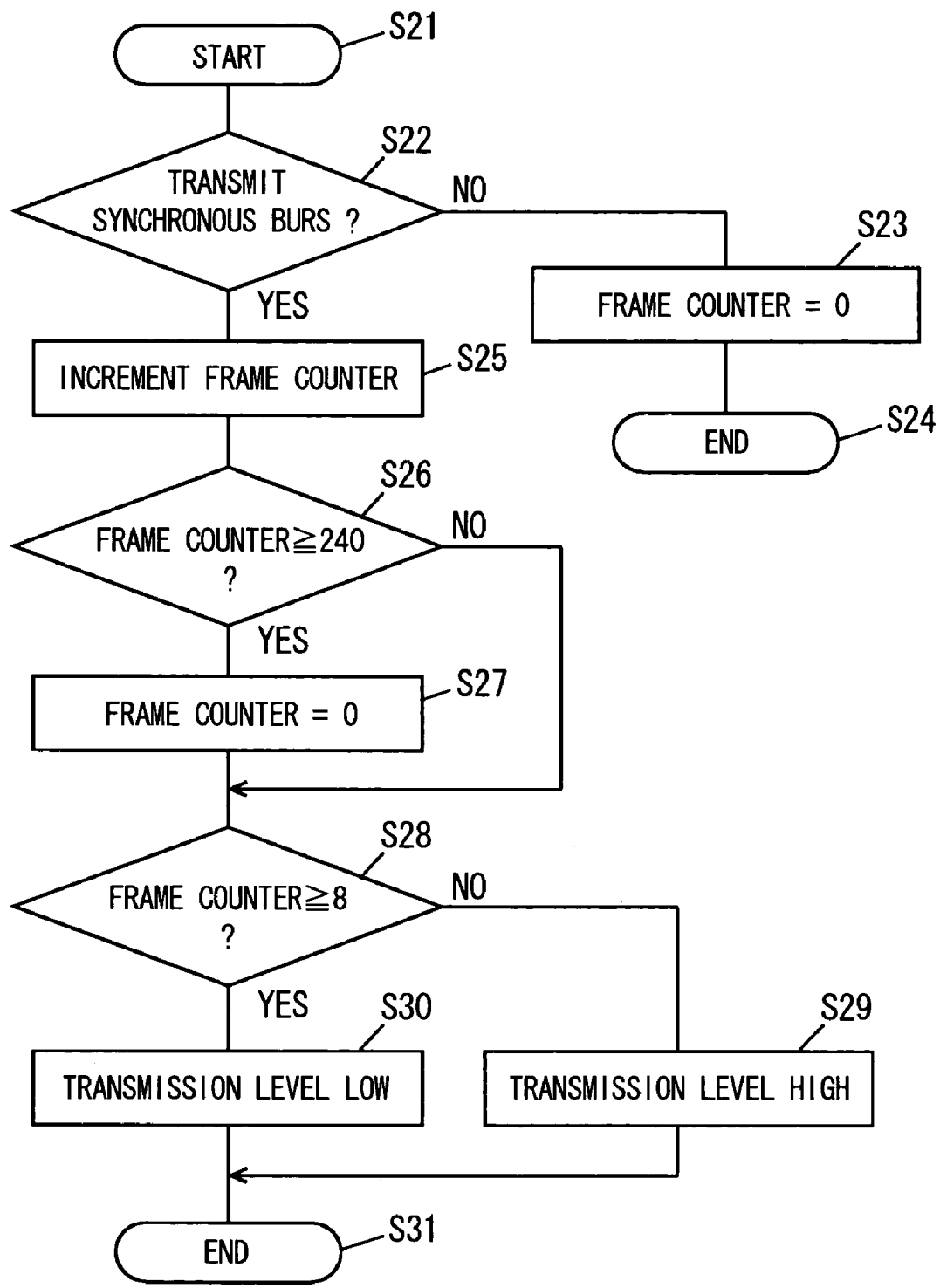
FIG. 6 is a flowchart illustrating a process for controlling a transmission level of the synchronous burst for reconnection.

Next, FIG. 6 is a flowchart showing a control process, in which, after the instruction is given in step S10 of FIG. 5, to start transmission of the synchronous burst for reconnection, the CS controls a transmission level of the synchronous burst for reconnection in a cycle of 240 frames as shown in FIG. 4.

Referring to FIG. 6, when control starts in step S21, whether or not the instruction has been given to start transmission of the synchronous burst for reconnection in the frame is determined in step S22. If the instruction for transmission has not been given, a frame counter counting the number of frames is initialized to zero in step S23, and the process will end at step S24.

Meanwhile, if the instruction for transmission has been given, the frame counter is incremented by one corresponding to the frame in step S25. Whether or not the value of the frame counter is equal to or greater than 240 in the frame is determined in step S26. If the value is determined to be equal to or greater than 240, the frame counter is initialized to zero in step S27.

Then, the process will proceed to step S28, and whether or not the value of the frame counter is equal to or greater than eight is determined. In the frame, since the frame counter has been just initialized to zero in step S27, the value for the frame counter is less than eight. Therefore, the process will proceed to step S29, where the synchronous burst will be transmitted with a relatively high transmission level in the frame. The process of the frame will end at step S31.

The process of FIG. 6 is repeated for each frame, and the synchronous burst will be transmitted with a relatively high transmission level in step S29 during successive eight frames (frame counter value 0 to 7) until the value for the frame counter reaches eight in step S28.

Thereafter, if it is determined in step S28 that the value for the frame counter is equal to or greater than eight in a certain frame, the process will proceed to step S30, and the synchronous burst is transmitted with a relatively low level (or zero level) in the frame. The process of the frame will end at step S31.

The process of FIG. 6 is further continued for each frame, and the synchronous burst will be transmitted with a relatively low transmission level in step S30 during successive 232 frames (frame counter value 8 to 231) as shown in FIG. 4 until the value for the frame counter reaches 240 in step S26.

Thereafter, if it is determined in step S26 that the value for the frame counter is equal to or greater than 240 in a certain frame, the frame counter is again initialized to zero in step S27. The synchronous burst will be transmitted with a relatively low transmission level (or zero level) in step S29 further during successive eight frames, as shown in FIG. 4, until the value for the frame counter reaches eight in step S28.

As described above, using control of transmission of the synchronous burst shown in FIG. 6, there are periods during which transmission level of the synchronous burst for reconnection is high or low (or at zero level) in a certain frame cycle, as shown in the timing chart of FIG. 4. Therefore, an effect as an interfering wave of the synchronous burst for reconnection on other PSs connected to the CS can be lowered.

On the other hand, a transmission wave for other PSs connected to the CS is also regarded as a disturbance wave for the above described synchronous burst for reconnection. Therefore, a transmission level toward other PSs during transmission of the synchronous burst for reconnection should be lowered so that the disconnected PS can easily recognize a burst for reconnection to establish reconnection with the CS.

FIG. 7 is a flowchart showing a transmission control process of DSP 7 controlling a transmission level to other PSs when transmitting a synchronous burst for reconnection in such a manner.

Referring to FIG. 7, when the process starts in step S41, whether or not a user to which the synchronous burst with a high transmission level is supplied is present among the remaining users that have established path multiple access to the same slot is determined in step S42.

If such a user is not present, the process will end at step S45. On the other hand, if it is determined in step S42 that a user with high transmission level is present, the process for lowering the transmission level is performed in step S43. Then, the process will end at step S45.

Thus, an adverse effect as an interfering wave, caused dependent on a transmission level to other users that have established path multiple access, on the synchronous burst for reconnection can be prevented, and the disconnected PS can easily recover connection to the CS.

When controlling transmission of the synchronous burst shown in FIG. 6, as described in conjunction with FIG. 1, it was assumed that the number of users that have established multiple access in each slot was two, and that control of transmission of the synchronous burst for reconnection was performed for one of the two users. Meanwhile, for example, if three or more users have established multiple access to each slot, and moreover, for two or more users among them, the synchronous bursts for reconnection are simultaneously transmitted, transmission cycles thereof may overlap. If the transmission cycles of two or more synchronous bursts for reconnection without transmission directivity overlap, it will be difficult for a corresponding PS to accurately recognize the synchronous burst for reconnection and to establish reconnection to the CS.

Figure 8:
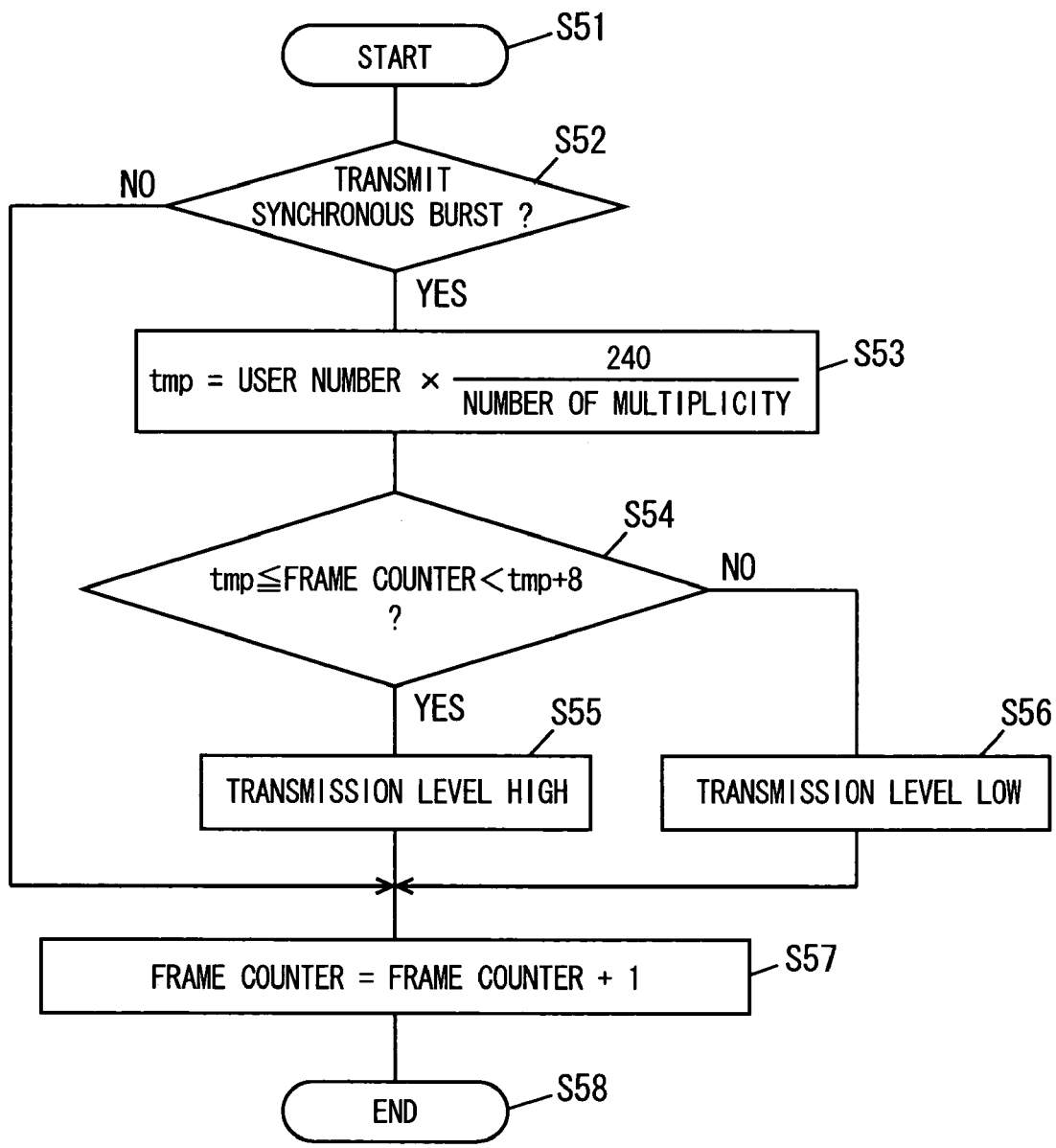
FIG. 8 is a flowchart illustrating another example of a process for controlling a transmission level of a synchronous burst for reconnection.
Figure 9:
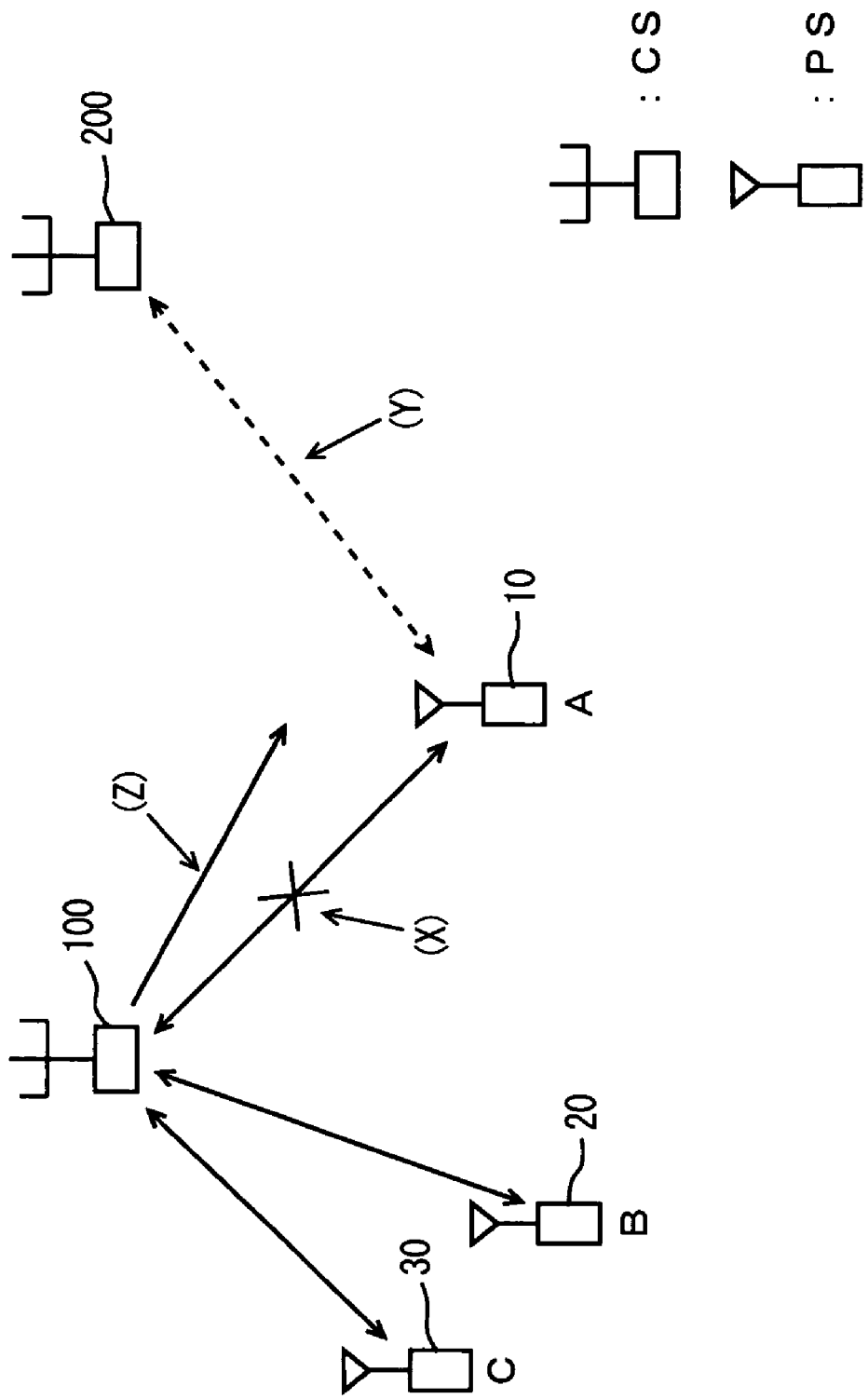
FIG. 9 schematically shows path multiple access state between a CS and PSs in the PDMA system.

FIG. 8 is a flowchart showing a process for controlling a transmission level of a synchronous burst for reconnection in such multiple access state. In the process of FIG. 6, a frame counter counting 240 frames, that is, one process cycle, and a frame counter counting eight frames during which the transmission level is set high are employed. In an example of FIG. 8, however, only one frame counter is provided, and sequentially defines a time period during which each user transmits with a high transmission level.

For example, when the synchronous burst for reconnection is transmitted respectively to four users that have established multiple access, for user number 0, the transmission level is set high for a period of frame 0 to 7 of 240 frames provided as one cycle, and is set low for a period of frame 8 to 239. Next, for user number 1, the transmission level is set high for a period of frame 60 to 67, and is set low for a period of frame 0 to 59 and 68 to 239. Next, for user number 2, the transmission level is set high for a period of frame 120 to 127, and is set low for a period of frame 0 to 119 and 128 to 239. Next, for user number 3, the transmission level is set high for a period of frame 180 to 187, and is set low for a period of frame 0 to 179 and 188 to 239.

The process will be specifically described with reference to FIG. 8. When control starts in step S51, whether or not an instruction for transmission of a synchronous burst for reconnection has been given in the frame is determined in step S52. If the instruction has not been given, the frame counter is incremented by one in step S57, and the process will end at step S58.

Meanwhile, if the instruction has been given, "tmp" is given in step S53, which is a value obtained by multiplying a user number by the number of frames. Here, the number of frames is obtained by dividing 240, which is the number of frames for one cycle, by the number of users that have established multiple access.

In the example where four users have established multiple access as described above, tmp for user number 0 is 0; tmp for user number 1 is 60; tmp for user number 2 is 120; and tmp for user number 3 is 180.

For example, if user number is 0, whether or not the value of the frame counter is equal to or greater than tmp=0 and less than tmp+8=8 is determined in step S54. For user number 0, as the transmission level is set high during this frame period as described above, the process will proceed to step S55, where the synchronous burst for reconnection for user number 0 will be transmitted with a relatively high transmission level.

On the other hand, if the value of the frame counter is not in the above range, the process will proceed to step S56, where the synchronous burst for reconnection for user number 0 will be transmitted with a relatively low transmission level.

After the synchronous burst is transmitted in steps S55 or S56, the frame counter is incremented by one in step S57, and the process will end at step S58.

Next, for user number 1, whether or not the value of the frame counter is equal to or greater than tmp=60 and less than tmp+8=68 is determined in step S54. For user number 1, as the transmission level is set high during this frame period as described above, the process will proceed to step S55, where the synchronous burst for reconnection for user number 1 will be transmitted with a relatively high transmission level.

On the other hand, if the value of the frame counter is not in the above range, the process will proceed to step S56, where the synchronous burst for reconnection for user number 1 will be transmitted with a relatively low transmission level.

Next, for user number 2, whether or not the value of the frame counter is equal to or greater than tmp=120 and less than tmp+8=128 is determined in step S54. For user number 2, as the transmission level is set high during this frame period as described above, the process will proceed to step S55, where the synchronous burst for reconnection for user number 2 will be transmitted with a relatively high transmission level.

On the other hand, if the value of the frame counter is not in the above range, the process will proceed to step S56, where the synchronous burst for reconnection for user number 2 will be transmitted with a relatively low transmission level.

Next, for user number 3, whether or not the value of the frame counter is equal to or greater than tmp=180 and less than tmp+8=188 is determined in step S54. For user number 3, as the transmission level is set high during this frame period as described above, the process will proceed to step S55, where the synchronous burst for reconnection for user number 3 will be transmitted with a relatively high transmission level.

On the other hand, if the value of the frame counter is not in the above range, the process will proceed to step S56, where the synchronous burst for reconnection for user number 3 will be transmitted with a relatively low transmission level.

Note that, for the PS being connected to the CS, control of FIG. 7 as previously described is performed.

As described above, in controlling transmission shown in FIG. 8, when a synchronous burst for reconnection is transmitted to four users among those who have established multiple access, for each user, control by varying the transmission levels (high transmission level for eight frames, and low transmission level for 232 frames) in a 240 frame cycle as in the example of FIG. 6 is performed in a sequential, time-divided manner, with a cycle shifted from that of other users by 60 frames each. Thus, the transmission cycles of the synchronous burst can be prevented from overlapping among users, and the disconnected PS can easily recover connection to the CS.

As described above, according to the present invention, periods during which a synchronous burst for reconnection has high or low transmission level are alternately provided in a certain cycle. Therefore, an effect of the synchronous burst for reconnection as an interfering wave on other mobile terminals (PS) that have established path multiple access to the mobile base station (CS) can be lowered.

In addition, in the present invention, during a transmission period of the synchronous burst for reconnection, control is performed so that the transmission level to other PSs that have established path multiple access to the. CS is lowered, whereby the disconnected PS can easily establish reconnection to the CS.

INDUSTRIAL APPLICABILITY

According to the present invention, a synchronous burst for reconnection will not have an effect as an interfering wave on other mobile terminals that have established path multiple access to a radio base station. Therefore, the present invention is effective in a radio base system transmitting and receiving a signal to and from a plurality of mobile terminals that have established path multiple connection through a plurality of spatially-divided channels.

The invention claimed is:

1. A radio base station system transmitting and receiving a signal to and from a plurality of mobile terminals establishing path multiple access through a plurality of spatially-divided channels, comprising:
   a synchronous burst transmission unit transmitting a synchronous burst for reconnection for each signal frame through a disconnected channel when path multiple access to any of said plurality of mobile terminals is disconnected; and
   a synchronous burst transmission level set unit setting a transmission level of said synchronous burst for reconnection to a relatively high level in a plurality of first, successive frames, setting a transmission level of said synchronous burst for reconnection to a relatively low level in a plurality of second, successive frames, and periodically repeating setting of the transmission level in a frame cycle formed by said plurality of first, successive frames and said plurality of second, successive frames.

2. The radio base station system according to claim 1, wherein said synchronous burst transmission unit transmits, in a time-divided manner, for respective mobile terminals, a synchronous burst for reconnection having a transmission level set in said frame cycle, when there are a plurality of mobile terminals having path multiple access disconnected.

3. The radio base station system according to claim 1, wherein said relatively low level is set to zero level.

4. The radio base station system according to claim 1, further comprising a transmission level modifying unit lowering a transmission level for another mobile terminal among said plurality of mobile terminals during transmission of said synchronous burst for reconnection by said synchronous burst transmission unit.

5. A method of controlling transmission of a synchronous burst in a radio base station system transmitting and receiving a signal to and from a plurality of mobile terminals establishing path multiple access through a plurality of spatially-divided channels, comprising the steps of:

transmitting a synchronous burst for reconnection for each signal frame through a disconnected channel when path multiple access to any of said plurality of mobile terminals is disconnected; and setting a transmission level of said synchronous burst for reconnection to a relatively high level in a plurality of first, successive frames, setting a transmission level of said synchronous burst for reconnection to a relatively low level in a plurality of second, successive frames, and periodically repeating setting of the transmission level in a frame cycle formed by said plurality of first, successive frames and said plurality of second, successive frames.

6. The method according to claim 5, wherein in said step of transmitting the synchronous burst, when there are a plurality of mobile terminals having path multiple access disconnected, the synchronous burst for reconnection having a transmission level set in said frame cycle is transmitted in a time-divided manner for respective mobile terminals.

7. The method according to claim 5, wherein said relatively low level is set to zero level.

8. The method according to claim 5, further comprising the step of lowering a transmission level for another mobile terminal among said plurality of mobile terminals during transmission of said synchronous burst for reconnection.

9. A program for controlling transmission of a synchronous burst in a radio base station system transmitting and receiving a signal to and from a plurality of mobile terminals establishing path multiple access through a plurality of spatially-divided channels, causing a computer to execute the steps of:

transmitting a synchronous burst for reconnection for each signal frame through a disconnected channel when path multiple access to any of said plurality of mobile terminals is disconnected; and setting a transmission level of said synchronous burst for reconnection to a relatively high level in a plurality of first, successive frames, setting a transmission level of said synchronous burst for reconnection to a relatively low level in a plurality of second, successive frames, and periodically repeating setting of the transmission level in a frame cycle formed by said plurality of first, successive frames and said plurality of second, successive frames.

10. The program according to claim 9, wherein in said step of transmitting the synchronous burst, when there are a plurality of mobile terminals having path multiple access disconnected, the synchronous burst for reconnection having a transmission level set in said frame cycle is transmitted in a time-divided manner for respective mobile terminals.

11. The program according to claim 9, wherein said relatively low level is set to zero level.

12. The program according to claim 9, further comprising the step of lowering a transmission level for another mobile terminal among said plurality of mobile terminals during transmission of said synchronous burst for reconnection.

\* \* \* \* \*